(12) United States Patent
Lacaux et al.

(10) Patent No.: US 12,009,671 B2
(45) Date of Patent: Jun. 11, 2024

(54) SYSTEM AND METHOD FOR GROUND FAULT MONITORING IN AN AIRCRAFT

(71) Applicant: The Boeing Company, Chicago, IL (US)

(72) Inventors: Frederic Lacaux, Woodinville, WA (US); Shengyi Liu, Sammamish, WA (US); Eugene V. Solodovnik, Kenmore, WA (US); Vyacheslav Khozikov, Bellevue, WA (US); Kamiar J. Karimi, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 17/674,669

(22) Filed: Feb. 17, 2022

(65) Prior Publication Data

US 2023/0261476 A1 Aug. 17, 2023

(51) Int. Cl.
*H02J 4/00* (2006.01)
*B60L 50/51* (2019.01)
*H02H 3/16* (2006.01)
*B64D 45/00* (2006.01)

(52) U.S. Cl.
CPC ............... *H02J 4/00* (2013.01); *B60L 50/51* (2019.02); *H02H 3/165* (2013.01); *B60L 2200/10* (2013.01); *B60L 2210/40* (2013.01); *B64D 2045/0085* (2013.01); *B64D 2221/00* (2013.01); *H02J 2310/44* (2020.01)

(58) Field of Classification Search
CPC ........ H02H 3/32; H02H 3/165; H02H 7/1257; H02H 7/0838; B60L 3/0061; B60L 3/0069; B60L 15/007; B60L 50/51; B60L 2210/40; B60L 2210/42; B60L 2210/30; B60L 2240/529; B60L 2240/429; B60L 2200/10; H02J 4/00; H02J 2310/44; B60D 2221/00; B60D 2045/0085
USPC .......................................................... 361/44
See application file for complete search history.

(56) References Cited

U.S. PATENT DOCUMENTS

| 10,608,575 | B2 * | 3/2020 | Kawazu | ............... H02P 29/0241 |
| 2011/0241590 | A1 * | 10/2011 | Horikoshi | ............ H02H 7/0838 |
| | | | | 318/490 |
| 2013/0293988 | A1 * | 11/2013 | Li | .......................... H02P 29/027 |
| | | | | 361/30 |

(Continued)

FOREIGN PATENT DOCUMENTS

EP 2141788 A2 * 1/2010 ........... H02H 7/1216

*Primary Examiner* — Kevin J Comber
(74) *Attorney, Agent, or Firm* — Quinn IP Law

(57) ABSTRACT

An electrical system for an aircraft includes an AC electric power source electrically connected to a rotary electric motor via a plurality of AC contactors. An AC/DC inverter is electrically connected to the rotary electric motor, a DC power bus is electrically connected to the AC/DC inverter, and a plurality of sensors are arranged to monitor electric currents between the AC electric power source and the rotary electric motor. A first controller is arranged to control the AC/DC inverter; and a second controller is arranged to monitor the sensors and are operatively connected to the AC contactors. The second controller is operable to monitor, via the sensors, the electric currents between the AC electric power source and the rotary electric motor, and detect a fault based upon the electric currents, and deactivate the AC contactors in response to the fault.

20 Claims, 3 Drawing Sheets

(56) References Cited

U.S. PATENT DOCUMENTS

| | | | |
|---|---|---|---|
| 2015/0091582 A1* | 4/2015 | Wei | G01R 31/52 |
| | | | 324/509 |
| 2023/0030964 A1* | 2/2023 | Horinouchi | B60R 16/03 |

* cited by examiner

SYSTEM AND METHOD FOR GROUND FAULT MONITORING IN AN AIRCRAFT

INTRODUCTION

Aircraft employ various electrical and electronic devices and systems to perform functions on the aircraft. For example, without limitation, electric motors on an aircraft may be used to move flight control surfaces, to pressurize hydraulics, to pump fuel, and to perform other functions on the aircraft. Power for the electric motors and other electronic systems and devices on an aircraft may be provided by an electric power system.

Electric power systems in aircraft may differ from ground-based electrical utility power systems in several ways. For example, without limitation, electric power systems in aircraft may employ direct current (DC) buses to power electric motors, motor controllers for the electric motors, and other DC loads on the aircraft. Power for the DC buses may be provided via a power converter configured to convert alternating current (AC) power on an AC bus to DC power on one or more DC buses. AC power is provided on the AC bus by a generator on the aircraft. The generated AC power may be consumed by loads connected to the DC buses, such as motor drive units and battery charging units. Voltage levels on the DC buses may be selected to reduce currents and weight associated with power distribution on the aircraft.

A fault in a wire cable, power bus, or power distribution center may lead to a ground fault, which can induce asymmetric three-phase currents. A fault may be caused by material aging, chafing, vibration, exposure to temperature extremes of heat or cold, exposure to moisture, wire clamping, and/or other factors.

One response to occurrence of a ground fault is to induce a fault interruption by opening circuit breaker contact switches. However, opening circuit breaker contact switches may be difficult due to the induced asymmetric three-phase currents.

In Hybrid-Electric (HE) or More Electric Aircraft (MEA) power systems, Ground Fault Protection (GFP) quickly reacts to low current levels to limit fault energy and minimize mechanical stress to the airplane structure. Known Over-Current (OC) protection systems are not as sensitive as GFP because nominal current of the load may be large and there are even larger transients (for example, due to motor startup or inrush currents). Because of that, known OC protection current threshold limits are set above nominal operation levels including transients. OC protection time delays must also exceed duration of all nominal transients. This results in large OC protection current thresholds with longer protection timeout delays, which may result in unwanted higher energy.

As such, there is a need for improved fault protection for aircraft electric power systems that utilize large, high power electric loads, such as may be implemented in HE and MEA power systems. Furthermore, there is a need for a system, apparatus, and/or method for fault monitoring and mitigation.

SUMMARY

The concepts described herein provide a ground fault monitoring system, apparatus, and/or method for an aircraft electrical power system.

The concepts described herein provide an electrical system for an aircraft that includes a polyphase AC electric power source that is electrically connected to a polyphase rotary electric motor via a plurality of AC contactors. An AC/DC inverter electrically connected to the polyphase rotary electric motor, a DC power bus electrically connected to the AC/DC inverter, and a plurality of sensors arranged to monitor a plurality of electric currents between the polyphase AC electric power source and the polyphase rotary electric motor. A first controller is arranged to control the AC/DC inverter; and a second controller is arranged to monitor the plurality of sensors and is operatively connected to the plurality of AC contactors. The second controller is operable to monitor, via the plurality of sensors, the plurality of electric currents between the polyphase AC electric power source and the polyphase rotary electric motor, and detect a fault based upon the plurality of electric currents, and deactivate the plurality of AC contactors in response to the fault.

An aspect of the disclosure includes the AC/DC inverter having a plurality of upper switches that are arranged in series with a plurality of lower switches between a positive side of the DC power bus and a negative side of the DC power bus. The second controller is configured to communicate the fault to the first controller, and the first controller is configured to open the plurality of upper switches and close the plurality of lower switches in response to the fault. The second controller is configured to deactivate the plurality of AC contactors when the first controller opens the plurality of upper switches and closes the plurality of lower switches. In this manner, the AC/DC conversion stage is operated in a short-circuit mode to force 3-phase fault currents to become symmetric, thus making it easier to open the AC contactors.

Another aspect of the disclosure includes the second controller being operable to detect the fault by detecting an asymmetry between the plurality of electric currents.

Another aspect of the disclosure includes the second controller being operable to detect a ground fault in the DC power bus based upon the plurality of electric currents.

Another aspect of the disclosure includes the AC/DC inverter being electrically connected to a plurality of 3-phase windings arranged on a stator of the polyphase rotary electric motor, wherein each of the plurality of 3-phase windings is electrically connected to a respective neutral lead; and wherein the respective neutral lead is connected to one of the phases of the polyphase AC electric power source via one of the plurality of AC contactors.

Another aspect of the disclosure includes each of the plurality of AC contactors being a switch.

Another aspect of the disclosure includes the DC power bus being electrically connected to a DC power device, wherein the first controller is operable to deactivate the AC/DC inverter to deactivate the DC power device in response to the fault.

Another aspect of the disclosure includes the DC power device being a DC-powered actuator.

Another aspect of the disclosure includes the DC power device being a rechargeable electrical energy storage device.

Another aspect of the disclosure includes the second controller being operable to open the plurality of AC contactors to deactivate the polyphase rotary electric motor in response to the fault.

Another aspect of the disclosure includes a ground fault monitoring system for an aircraft that includes a plurality of sensors arranged to monitor a plurality of electric currents between a polyphase AC electric power source and a polyphase rotary electric motor. A first controller is arranged to control the AC/DC inverter, and a second controller is arranged to monitor the plurality of sensors and is operatively connected to the plurality of AC contactors. The second controller is operable to monitor, via the plurality of sensors, the plurality of electric currents between the polyphase AC electric power source and the polyphase rotary electric motor, detect a ground fault based upon the plurality of electric currents, and deactivate the plurality of AC contactors in response to the ground fault.

Another aspect of the disclosure includes the AC/DC inverter having a plurality of upper switches that are arranged in series with a plurality of lower switches between a positive side of the DC power bus and a negative side of the DC power bus, wherein the second controller is configured to communicate the ground fault to the first controller, and wherein the first controller is configured to open the plurality of upper switches and close the plurality of lower switches in response to the ground fault. The second controller is configured to deactivate the plurality of AC contactors when the first controller opens the plurality of upper switches and closes the plurality of lower switches.

Another aspect of the disclosure includes a method for controlling an electrical system for an aircraft that includes a polyphase AC electric power source electrically connected to a polyphase rotary electric motor via a plurality of AC contactors, an AC/DC inverter electrically connected to the polyphase rotary electric motor, a first controller operably connected to the AC/DC inverter, and a DC power bus electrically connected to the AC/DC inverter. The method includes monitoring, via a plurality of sensors, a plurality of electric currents between the polyphase AC electric power source and the polyphase rotary electric motor; detecting, via a second controller in communication with the plurality of sensors, a fault based upon the plurality of electric currents; and deactivating, via the second controller, the plurality of AC contactors in response to the fault.

Another aspect of the disclosure includes the AC/DC inverter having a plurality of upper switches that are arranged in series with a plurality of lower switches between a positive side of the DC power bus and a negative side of the DC power bus. The method further includes communicating, via the second controller, the fault to the first controller; controlling, via the first controller, the plurality of upper switches to an open state and controlling the plurality of lower switches to a closed state in response to the fault; and deactivating, via the second controller, the plurality of AC contactors.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. The use of ordinals such as first, second and third does not necessarily imply a ranked sense of order, but rather may only distinguish between multiple instances of an act or structure.

Figure 1:
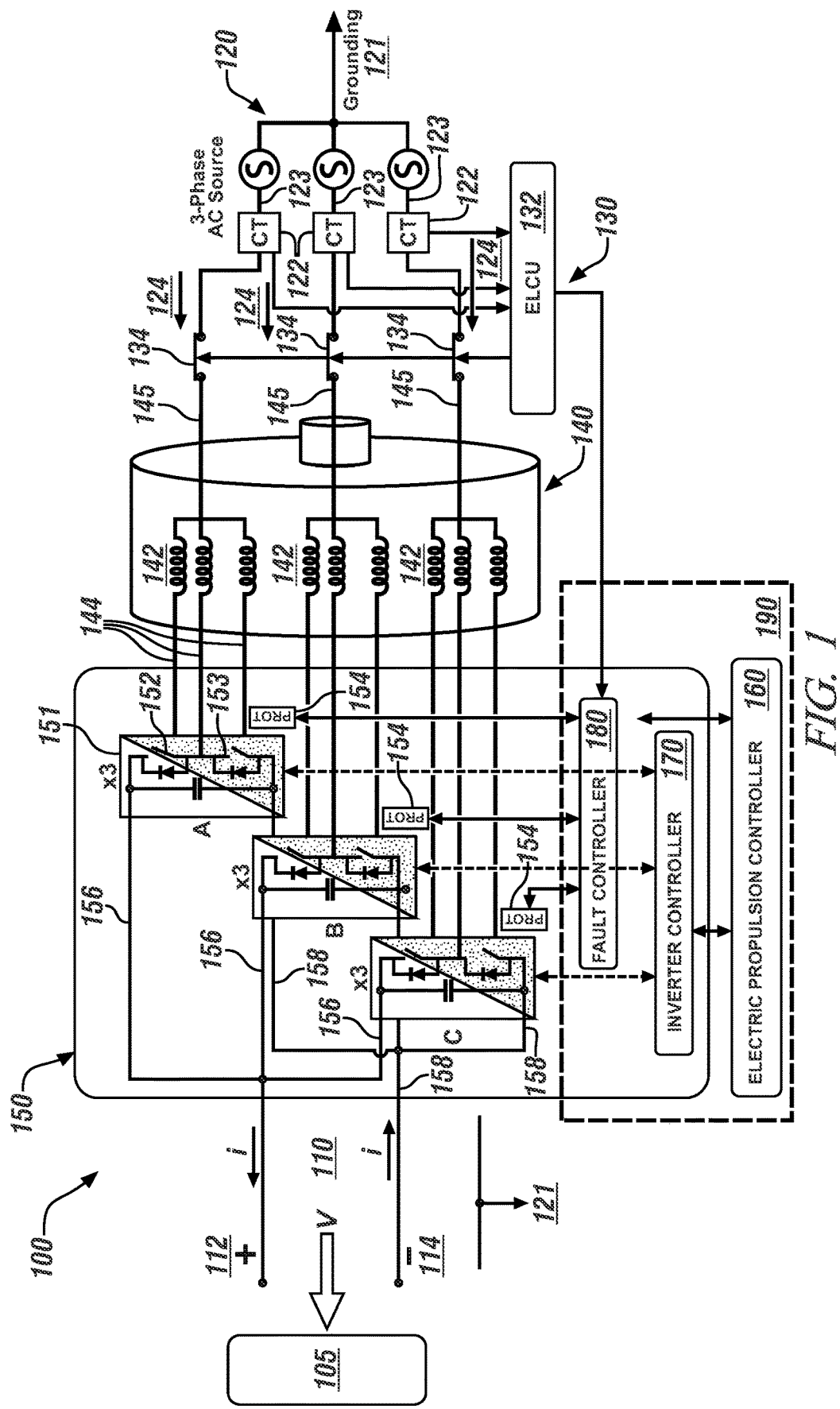
FIG. 1 schematically illustrates an embodiment of an electrical system for an aircraft that includes a polyphase AC electric power source that is electrically connected to a polyphase rotary electric motor, and an associated ground fault monitoring system, in accordance with the disclosure.

FIG. 1 schematically illustrates an embodiment of an electrical system 100 for an aircraft that includes a polyphase AC electric power source 120 that is electrically connected to a polyphase rotary electric motor 140, which in turn is electrically connected to a DC/AC inverter/rectifier system 150 that electrically connects to a DC power bus 110. The DC power bus 110 is electrically isolated from a chassis ground 121, and includes a positive rail 112 and a negative rail 114. Operation of the DC/AC inverter/rectifier system 150 is controlled by an inverter/rectifier control system (first controller) 190 that includes, in one embodiment, an electric propulsion controller 160, an inverter controller 170, and a fault controller 180. A ground fault monitoring system 130 is arranged to monitor the electrical system 100 to detect occurrence of a ground fault and control operation of the electrical system 100 in response.

The DC power bus 110 electrically connects to one or multiple DC loads 105, which may include one or multiple actuators and/or a DC power source such as a rechargeable energy storage device. The actuators may be operatively connected to moveable surfaces of the aircraft, examples of which are described with reference to FIG. 3.

In one embodiment, the electrical system 100 is configured as a motor-integrated charging system that is operable to transfer electrical power to charge the DC load 105 when it is arranged as a rechargeable energy storage device. In one embodiment, the electric propulsion controller 160 commands the inverter controller 170 to control inverters/rectifiers 151 of the DC/AC inverter/rectifier system 150 such that the DC load 105, i.e., the battery is charged at a current of I and a voltage of V, wherein magnitudes of I and V are determined according to a charging protocol.

The polyphase AC electric power source 120 may be arranged as a three-phase AC electric power source having three legs 123 that are electrically connected to corresponding neutral leads 145 of the polyphase rotary electric motor 140 via a corresponding plurality of AC contactors 134. The plurality of AC contactors 134 are part of the ground fault monitoring system 130. The plurality of AC contactors are configured as a 3-phase circuit breaker in one embodiment.

The polyphase rotary electric motor 140 includes a rotor and a stator, and may be a permanent magnet device, an induction motor, a synchronous motor, or another electric motor configuration, without limitation. The stator includes a plurality of electrical windings that are circumferentially arranged in the stator, and are sequentially excited to induce mechanical work in the rotor. In one embodiment, the polyphase rotary electric motor 140 is a nine-phase electric motor with three sets of 3-phase windings 142 arranged on the stator, with each of the 3-phase windings 142 electrically connected to one of the neutral leads 145.

The DC/AC inverter/rectifier system 150 includes a plurality of inverter/rectifiers 151, an inverter controller 170, and a fault controller 180. Operation of the DC/AC inverter/rectifier system 150 is controlled by an electric propulsion controller 160, which is in communication with and controls the inverter controller 170 and the fault controller 180.

In one embodiment, the DC/AC inverter/rectifier system 150 is configured in a 3×3-phase arrangement of inverter/rectifiers 151, illustrated as inverter/rectifiers A, B, and C. In the figure, only one of the phase-legs 144 of the 3-phase device is shown. The inverter/rectifiers 151 are configured such that positive leads 156 are connected to the positive rail 112 of the DC power bus 110, and negative leads 158 are connected to the negative rail 114 of the DC power bus 110.

Each of the inverter/rectifiers 151 is configured with control circuits including an upper switch 152 arranged in series with a lower switch 153 between the positive rail 112 and the negative rail 114 of the DC power bus 110. The upper and lower switches 152, 153 are power transistors, e.g., IGBTs or MOSFETs, which are operatively connected to the inverter controller 170. The inverter controller 170 employs pulsewidth-modulating (PWM) control to control the upper and lower switches 152, 153 to transform DC electric power to AC electric power and transform AC electric power to DC electric power.

The ground fault monitoring system 130 includes a plurality of sensors 122, an electric load control unit (ELCU) (second controller) 132, and the plurality of AC contactors 134. The plurality of sensors 122 are arranged to monitor electric power flow in the three legs 123 of the polyphase AC electric power source 120. In one embodiment, the plurality of sensors 122 are current sensors.

During operation of the electrical system 100 in the absence of an electrical fault, such as a ground fault, electric power flows between the polyphase AC electric power source 120, the polyphase rotary electric motor 140, and the DC/AC inverter/rectifier system 150 to operate the polyphase rotary electric motor 140 and generate electric power that is supplied to the DC load 105 for purposes of charging or operation. The plurality of AC contactors 134 are activated, i.e., in a closed state to conduct electricity.

The electrical system 100 operates as follows upon occurrence of an electrical fault such as a ground fault. Signal outputs from the plurality of sensors 122 are monitored by the ELCU 132, which first detects an abnormal current level and/or asymmetric 3-phase currents or another electrical imbalance that indicates occurrence of a ground fault. It is appreciated that occurrence of the ground fault may be constant or intermittent.

When a ground fault is detected, the ELCU 132 communicates this result to the fault controller 180, which in turn communicates the result to the electric propulsion controller 160. The fault controller 180 communicates a command to protection circuit drivers 154 that are connected to the plurality of inverter/rectifiers 151 of the DC/AC inverter/rectifier system 150. The protection circuit drivers 154 are arranged to control the inverters/rectifiers 151 such that the upper switches 152 of the phase legs (total 9 legs) are open, and the lower switches 153 of the phase legs are closed, in one embodiment. In this way, the inverters/rectifiers 151 form a shorting node for the polyphase AC electric power source 120. This results in a 3-phase symmetric short circuit, with the 3-phase fault currents being symmetric too. Alternatively, the protection circuit drivers 154 are arranged to control the inverters/rectifiers 151 such that the upper switches 152 of the phase legs (total 9 legs) are closed, and the lower switches 153 of the phase legs are opened. When a symmetric short circuit is formed, the ELCU 132 commands the plurality of AC contactors 134 to the open state to interrupt the fault current, and thus protect the polyphase AC electric power source 120. The DC load 105 is protected separately. In this manner, the inverters/rectifiers 151 form a 3-phase short circuit and create symmetric 3-phase fault currents. Then the plurality of AC contactors 134 can be opened to protect the polyphase AC electric power source 120 and the electrical system 100.

Figure 2:
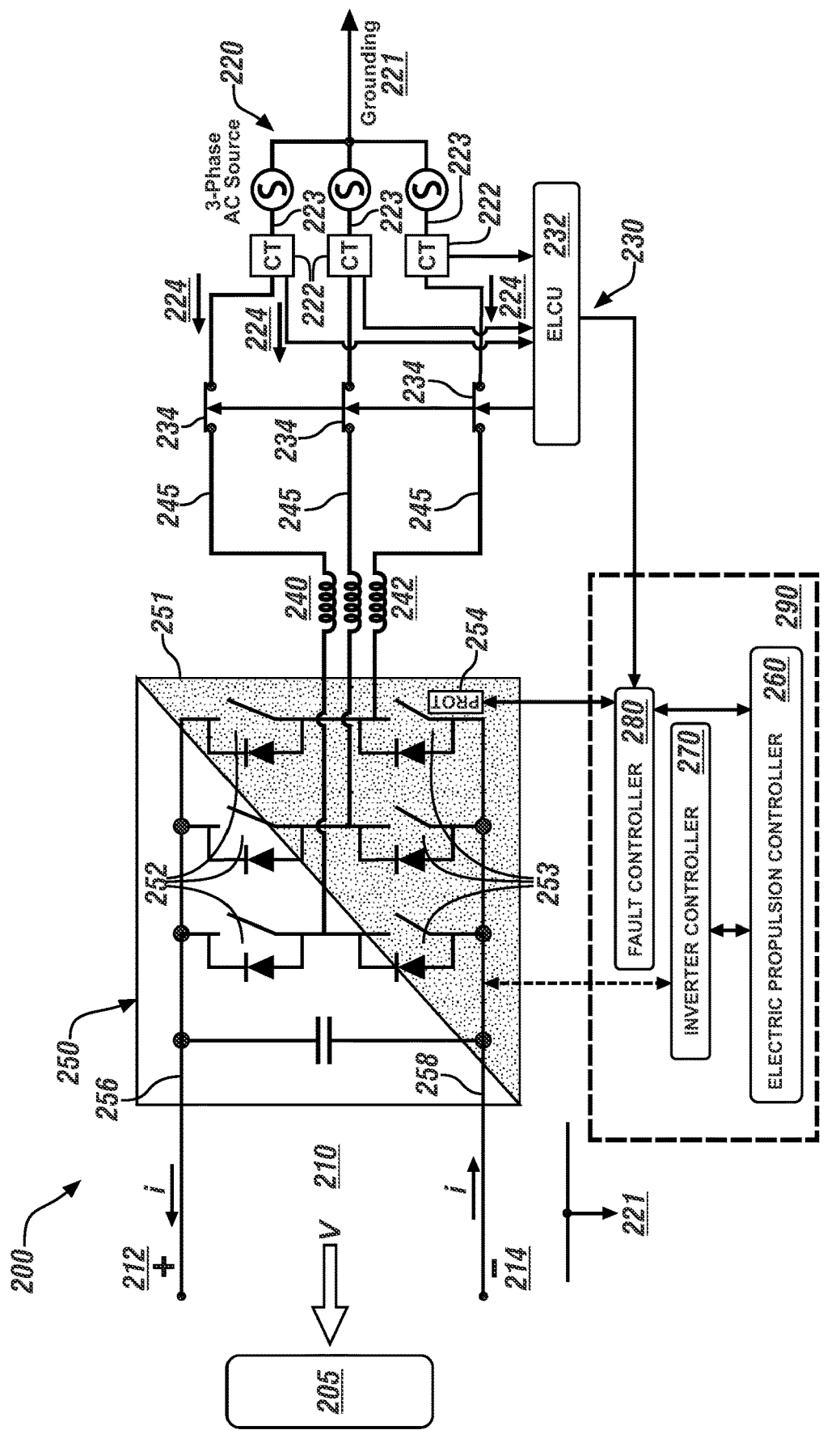
FIG. 2 schematically illustrates another embodiment of an electrical system for an aircraft that includes a polyphase AC electric power source that is electrically connected to a polyphase rotary electric motor, and an associated ground fault monitoring system, in accordance with the disclosure.

FIG. 2 schematically illustrates another embodiment of an electrical system 200 for an aircraft that includes a polyphase AC electric power source 220 that is electrically connected to a polyphase rotary electric motor 240, which in turn is electrically connected to a DC/AC inverter/rectifier system 250 that electrically connects to a DC power bus 210. The DC power bus 210 is electrically isolated from a chassis ground 221, and includes a positive rail 212 and a negative rail 214. Operation of the DC/AC inverter/rectifier system 250 is controlled by an inverter/rectifier control system (first controller) 290 that includes, in one embodiment, an electric propulsion controller 260, an inverter controller 270, and a fault controller 280. A ground fault monitoring system 230 is arranged to monitor the electrical system 200 to detect occurrence of a ground fault and control operation of the electrical system 200 in response.

The DC power bus 210 electrically connects to one or multiple DC loads 205, which may include one or multiple actuators and/or a DC power source such as a rechargeable energy storage device. The actuators may be operatively connected to moveable surfaces of the aircraft, examples of which are described with reference to FIG. 3.

In one embodiment, the electrical system 200 is configured as a motor-integrated charging system that is operable to transfer electrical power to charge the DC load 205 when it is arranged as a rechargeable energy storage device. In one embodiment, the electric propulsion controller 260 commands the inverter controller 270 to control inverters/rectifiers 251 of the DC/AC inverter/rectifier system 250 such that the DC load in the form of battery 205 is charged at a current of I and a voltage of V, wherein magnitudes of I and V are determined according to a charging protocol.

The polyphase AC electric power source 220 may be arranged as a three-phase AC electric power source having three legs 223 that are electrically connected to corresponding leads 245 of the polyphase rotary electric motor 240 via a corresponding plurality of AC contactors 234. The plurality of AC contactors 234 are part of the ground fault monitoring system 230.

The polyphase rotary electric motor 240 includes a rotor and a stator, and may be a permanent magnet device, an induction motor, a synchronous motor, or another electric motor configuration, without limitation. The stator includes a plurality of electrical windings that are circumferentially arranged in the stator, and are sequentially excited to induce mechanical work in the rotor. In one embodiment, the polyphase rotary electric motor 240 is a three-phase electric motor with a set of 3-phase windings 242 arranged on the stator, with each of the 3-phase windings 242 electrically connected to one of the leads 245.

The DC/AC inverter/rectifier system 250 includes an inverter/rectifier 251, an inverter controller 270, and a fault controller 280. Operation of the DC/AC inverter/rectifier system 250 is controlled by an electric propulsion controller 260, which is in communication with and controls the inverter controller 270 and the fault controller 280.

In one embodiment, the DC/AC inverter/rectifier system 250 is configured as a 3-phase arrangement of an inverter/rectifier 251, the inverter/rectifier 251 is configured such that positive leads 256 are connected to the positive rail 212 of the DC power bus 210, and negative leads 258 are connected to the negative rail 214 of the DC power bus 210.

The inverter/rectifier 251 is configured with control circuits including an upper switch 252 arranged in series with a lower switch 253 between the positive rail 212 and the negative rail 214 of the DC power bus 210. The upper and lower switches 252, 253 are power transistors, e.g., IGBTs or MOSFETs, which are operatively connected to the inverter controller 270. The inverter controller 270 employs pulsewidth-modulating (PWM) control to control the upper and lower switches 252, 253 to transform DC electric power to AC electric power and transform AC electric power to DC electric power.

The ground fault monitoring system 230 includes a plurality of sensors 222, an electric load control unit (ELCU) (second controller) 232, and the plurality of AC contactors 234. The plurality of sensors 222 are arranged to monitor electric power flow in the three legs 223 of the polyphase AC electric power source 220. In one embodiment, the plurality of sensors 222 are current sensors.

During operation of the electrical system 200 in the absence of an electrical fault, such as a ground fault, electric power flows between the polyphase AC electric power source 220, the rotary electric motor 240, and the DC/AC inverter/rectifier system 250 to operate the rotary electric motor 240 and generate electric power that is supplied to the DC load 205 for purposes of charging or operation. The plurality of AC contactors 234 are activated, i.e., in a closed state to conduct electricity.

The electrical system 200 operates as follows upon occurrence of an electrical fault such as a ground fault. Signal outputs from the plurality of sensors 222 are monitored by the ELCU 232, which first detects an abnormal current level and/or asymmetric 3-phase currents or another electrical imbalance that indicates occurrence of a ground fault. It is appreciated that occurrence of the ground fault may be constant or intermittent.

When a ground fault is detected, the ELCU 232 communicates this result to the fault controller 280, which in turn communicates the result to the electric propulsion controller 260. The fault controller 280 communicates a command to a protection circuit driver 254 that is connected to the inverter/rectifier 251 of the DC/AC inverter/rectifier system 250. The protection circuit driver 254 is arranged to configure the inverters/rectifier 251 such that the upper switches 252 are open, and the lower switches 253 are closed. In this way, the inverters/rectifier 251 forms a shorting node for the polyphase AC electric power source 220. This results in a 3-phase symmetric short circuit, with the 3-phase fault currents being symmetric too. When a symmetric short circuit is formed, the ELCU 232 commands the plurality of AC contactors 234 to the open state to interrupt the fault current, and thus protect the polyphase AC electric power source 220. The DC load 205 is protected separately. In this manner, the inverters/rectifiers 251 form a 3-phase short circuit and create symmetric 3-phase fault currents. Then the plurality of AC contactors 234 can be opened to protect the AC source 120 and the electrical system 200.

Figure 3:
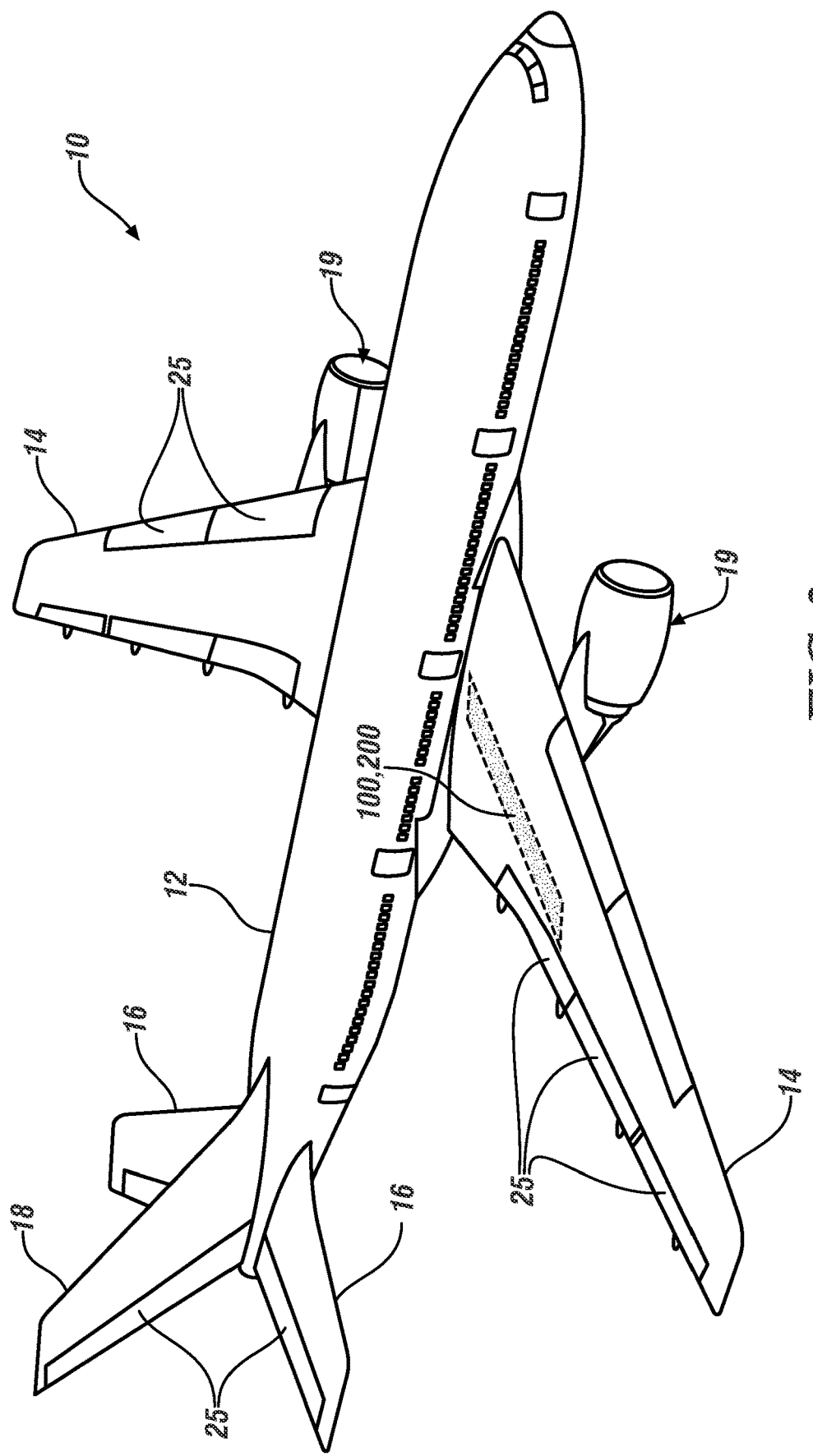
FIG. 3 schematically illustrates an aircraft that includes an embodiment of an electrical system having a ground fault monitoring system, in accordance with the disclosure.

FIG. 3 schematically illustrates a fixed wing aircraft 10 that has implemented an embodiment of the ground fault monitoring system 130, 230 described with reference to FIG. 1 or FIG. 2. Aircraft 10 includes a fuselage 12, one or more wings 14, a horizontal stabilizer 16, and a vertical stabilizer 18. The aircraft 10 also includes one or more turbine engines 19. Each of the one or more wings 14, horizontal stabilizer 16, and vertical stabilizer 18 includes a moveable surface 25 that is arranged on an outside skin of the aircraft 10. The moveable surfaces 25 include, e.g., flaps, ailerons, elevators, stabilizers, etc. The movement or displacement of one or more of the moveable surfaces 25 is controlled via a device that is powered by an embodiment of the electrical system 100 described with reference to FIG. 1 and/or the electrical system 200 described with reference to FIG. 2. Examples of the aircraft 10 include an airplane, a commercial aircraft, and/or a military aircraft. Alternatively, the concepts described herein may be employed as a propulsion device on a flying car, a drone, an electric vertical takeoff and landing vehicle (eVTOL), etc. Alternatively, the concepts described herein may be employed as a propulsion device on a marine system.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An electrical system for an aircraft, comprising:
   a polyphase AC electric power source electrically connected to a polyphase rotary electric motor via a plurality of AC contactors;
   an AC/DC inverter electrically connected to the polyphase rotary electric motor;
   a DC power bus electrically connected to the AC/DC inverter;
   a plurality of sensors arranged to monitor a plurality of electric currents between the polyphase AC electric power source and the polyphase rotary electric motor;
   a first controller arranged to control the AC/DC inverter; and
   a second controller arranged to monitor the plurality of sensors and operatively connected to the plurality of AC contactors;
   wherein the second controller is operable to:
      monitor, via the plurality of sensors, the plurality of electric currents between the polyphase AC electric power source and the polyphase rotary electric motor;
      detect a fault based upon the plurality of electric currents; and
      deactivate the plurality of AC contactors in response to the fault.

2. The electrical system of claim 1, wherein the AC/DC inverter includes a plurality of upper switches that are arranged in series with a plurality of lower switches between a positive side of the DC power bus and a negative side of the DC power bus;
   wherein the second controller is configured to communicate the fault to the first controller;
   wherein the first controller is configured to open the plurality of upper switches and close the plurality of lower switches in response to the fault; and
   wherein the second controller is configured to deactivate the plurality of AC contactors when the first controller opens the plurality of upper switches and closes the plurality of lower switches.

3. The electrical system of claim 1, wherein the second controller being operable to detect the fault based upon the plurality of electric currents comprises the second controller being operable to detect an asymmetry between the plurality of electric currents.

4. The electrical system of claim 1, wherein the second controller being operable to detect the fault based upon the plurality of electric currents comprises the second controller being operable to detect a ground fault in the DC power bus based upon the plurality of electric currents.

5. The electrical system of claim 1:
   wherein the AC/DC inverter is electrically connected to a plurality of 3-phase windings arranged on a stator of the polyphase rotary electric motor;
   wherein each of the plurality of 3-phase windings is electrically connected to a respective neutral lead; and
   wherein the respective neutral lead is connected to one of the phases of the polyphase AC electric power source via one of the plurality of AC contactors.

6. The electrical system of claim 1, wherein each of the plurality of AC contactors comprises a switch.

7. The electrical system of claim 1, wherein the DC power bus is electrically connected to a DC power device, and
   wherein the first controller is operable to deactivate the AC/DC inverter to deactivate the DC power device in response to the fault.

8. The electrical system of claim 7, wherein the DC power device comprises a DC-powered actuator.

9. The electrical system of claim 7, wherein the DC power device comprises a rechargeable electrical energy storage device.

10. The electrical system of claim 1, wherein the second controller is operable to open the plurality of AC contactors to deactivate the polyphase rotary electric motor in response to the fault.

11. A ground fault monitoring system for an aircraft, comprising:
   a polyphase AC electric power source electrically connected to a polyphase rotary electric motor via a plurality of AC contactors;
   an AC/DC inverter electrically connected to the polyphase rotary electric motor;
   a DC power bus electrically connected to the AC/DC inverter;
   a plurality of sensors arranged to monitor a plurality of electric currents between the polyphase AC electric power source and the polyphase rotary electric motor;
   a first controller arranged to control the AC/DC inverter; and
   a second controller arranged to monitor the plurality of sensors and operatively connected to the plurality of AC contactors;
   wherein the second controller is operable to:
      monitor, via the plurality of sensors, the plurality of electric currents between the polyphase AC electric power source and the polyphase rotary electric motor, detect a ground fault based upon the plurality of electric currents, and deactivate the plurality of AC contactors in response to the ground fault.

12. The ground fault monitoring system of claim 11, wherein the AC/DC inverter includes a plurality of upper switches that are arranged in series with a plurality of lower switches between a positive side of the DC power bus and a negative side of the DC power bus;

wherein the second controller is configured to communicate the ground fault to the first controller;

wherein the first controller is configured to open the plurality of upper switches and close the plurality of lower switches in response to the ground fault; and wherein the second controller is configured to deactivate the plurality of AC contactors when the first controller opens the plurality of upper switches and closes the plurality of lower switches.

13. The ground fault monitoring system of claim 11, wherein the second controller being operable to detect the ground fault based upon the plurality of electric currents comprises the second controller being operable to detect an imbalance between the plurality of electric currents.

14. The ground fault monitoring system of claim 11:

wherein the AC/DC inverter is electrically connected to a plurality of 3-phase windings arranged on a stator of the polyphase rotary electric motor;

wherein each of the plurality of 3-phase windings is electrically connected to a respective neutral lead; and wherein the respective neutral lead is connected to one of the phases of the polyphase AC electric power source via one of the plurality of AC contactors.

15. The ground fault monitoring system of claim 11, wherein each of the plurality of AC contactors comprises a switch.

16. The ground fault monitoring system of claim 11, wherein the DC power bus is electrically connected to a DC power device, and wherein the first controller is operable to deactivate the AC/DC inverter to deactivate the DC power device in response to the ground fault.

17. The ground fault monitoring system of claim 16, wherein the DC power device comprises one of a DC-powered actuator or a rechargeable electrical energy storage device.

18. The ground fault monitoring system of claim 11, wherein the second controller is operable to open the plurality of AC contactors to deactivate the polyphase rotary electric motor in response to the ground fault.

19. A method for controlling an electrical system for an aircraft that includes a polyphase AC electric power source electrically connected to a polyphase rotary electric motor via a plurality of AC contactors, an AC/DC inverter electrically connected to the polyphase rotary electric motor, a first controller operably connected to the AC/DC inverter, and a DC power bus electrically connected to the AC/DC inverter, the method comprising:

monitoring, via a plurality of sensors, a plurality of electric currents between the polyphase AC electric power source and the polyphase rotary electric motor;

detecting, via a second controller in communication with the plurality of sensors, a fault based upon the plurality of electric currents; and deactivating, via the second controller, the plurality of AC contactors in response to the fault.

20. The method of claim 19, wherein the AC/DC inverter includes a plurality of upper switches that are arranged in series with a plurality of lower switches between a positive side of the DC power bus and a negative side of the DC power bus;

the method further comprising:

communicating, via the second controller, the fault to the first controller;

controlling, via the first controller, the plurality of upper switches to an open state and controlling the plurality of lower switches to a closed state in response to the fault; and deactivating, via the second controller, the plurality of AC contactors.

* * * * *